(12) United States Patent
Hsu

(10) Patent No.: US 9,816,032 B2
(45) Date of Patent: Nov. 14, 2017

(54) LIQUID CRYSTAL ALIGNMENT AGENT AND USES THEREOF

(71) Applicant: CHI MEI CORPORATION, Tainan (TW)

(72) Inventor: Li-Tao Hsu, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 507 days.

(21) Appl. No.: 14/100,967

(22) Filed: Dec. 9, 2013

(65) Prior Publication Data

US 2014/0163146 A1   Jun. 12, 2014

(30) Foreign Application Priority Data

Dec. 11, 2012   (TW) .............................. 101146500 A

(51) Int. Cl.
   *C09K 19/00*   (2006.01)
   *C09K 19/56*   (2006.01)
(52) U.S. Cl.
   CPC .......... *C09K 19/56* (2013.01); *Y10T 428/1005* (2015.01); *Y10T 428/1023* (2015.01)
(58) Field of Classification Search
   CPC ...... C09D 179/08; C08K 5/3415; C08K 5/20; C08K 5/175; G02F 1/133723; G02F 1/133711; C08G 73/10; C08G 73/1007; C08G 73/101; Y10T 428/1005; Y10T 428/1023
   USPC ............. 428/1.1, 1.2, 1.25, 1.26, 1.27, 1.28; 525/419, 425, 428; 524/104, 109
   See application file for complete search history.

(56) References Cited

U.S. PATENT DOCUMENTS

| | | | | |
|---|---|---|---|---|
| 5,969,055 A | * | 10/1999 | Nishikawa et al. | .......... 525/419 |
| 2004/0013953 A1 | * | 1/2004 | Mune et al. | .................... 430/18 |
| 2012/0172542 A1 | * | 7/2012 | Tsai | .............................. 525/449 |

FOREIGN PATENT DOCUMENTS

| | | |
|---|---|---|
| TW | 200844141 | 11/2008 |
| TW | 201033252 | 9/2010 |
| WO | 2008/078796 | 7/2008 |

OTHER PUBLICATIONS

Polyethylene_Glycol, retrieved from internet, Apr. 2014.*
Office Action dated Jul. 11, 2014 by TIPO for the corresponding TW Patent Application No. 101146500 cites TW 200844141 and TW 201033252.
English Abstracts of TW 200844141 and TW 201033252.

* cited by examiner

*Primary Examiner* — Ruiyun Zhang
(74) *Attorney, Agent, or Firm* — WPAT, P.C., Intellectual Property Attorneys; Anthony King

(57) ABSTRACT

The invention relates to a liquid crystal alignment agent which provides a polymer composition (A), a solvent (B), and a poly(oxyalkyleneglycol)dialkylether compound (C); wherein the number average molecular weight of the poly (oxyalkyleneglycol)dialkylether compound (C) is from 250 to 2000. The invention also provides a liquid crystal alignment film made by the liquid crystal alignment agent as mentioned above and a liquid crystal display element which provides the liquid crystal alignment film, and the liquid crystal display element has high voltage holding rate and low ion density.

10 Claims, 1 Drawing Sheet

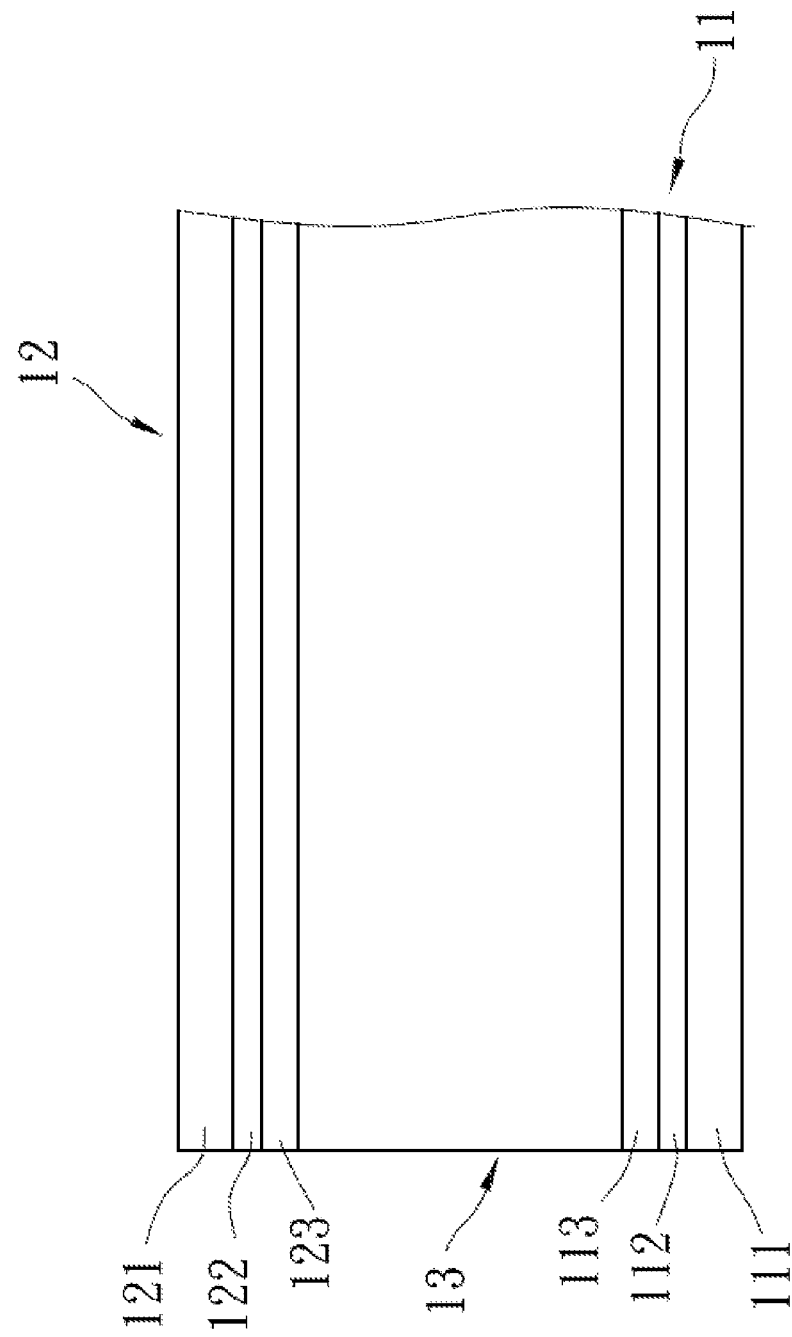

LIQUID CRYSTAL ALIGNMENT AGENT AND USES THEREOF

BACKGROUND OF THE INVENTION

1. Field of the Invention

The invention relates to a liquid crystal alignment agent and uses thereof. Particularly, the invention relates to a liquid crystal alignment agent having good UV stability, and a liquid crystal alignment film formed thereby and a liquid crystal display element having the liquid crystal alignment film.

2. Description of the Related Art

As the consumers' rising quality requirements to the liquid crystal display, the liquid crystal display element is developed toward high performance, in which the requirement of the electrical properties such as liquid crystal alignment property, the voltage holding ratio, the ion density, and image sticking and/or display quality is more even in the past. In addition to having good initial characteristics, the liquid crystal element is also required to be used for a long period of time in harsh environments, especially with good voltage holding ratio and ion density as the main consideration. When the voltage holding ratio of the liquid crystal display element decreases, the display quality cannot fully meet the demands of high contrast and high transmitance. When the ion density is increased, then image sticking and other issues easily occur.

Patent Cooperation Treaty Patent Publication No. WO2008/078796 discloses a liquid crystal alignment film having high voltage holding ratio and low ion density and an N-substituted diamine compound for producing a liquid crystal alignment agent. The N-substituted diamine compound has the structure as shown in Formula (1):

Formula (1)

wherein, $R^{a1}$ represents a $C_1$ to $C_5$ alkylene group; $R^{a2}$ and $R^{a3}$ is hydrogen or a $C_1$ to $C_4$ alkyl group, and wherein at least one is a $C_1$ to $C_4$ alkyl group. By using the N-substituted diamine compound, the alignment film produced thereby improves the poor quality of the low voltage holding ratio and high ion density of the conventional liquid crystal display element. However, the liquid crystal alignment film produced by the N-substituted diamine compound cannot be used for a long period of time. If the liquid crystal alignment film is subjected to UV irradiation for a period of time, the voltage holding ratio decreased and the ion density increased, and the low contrast and image sticking also occur in the liquid crystal element.

As shown above, in order to meet the requirements of the properties of the modern liquid crystal element, providing a liquid crystal alignment agent having good UV stability is needed in this field. If applying the liquid crystal alignment film produced thereby in a liquid crystal display element, high voltage holding ratio and low ion density can be maintained with a long-time UV irradiation.

SUMMARY OF THE INVENTION

A poly(oxyalkyleneglycol)dialkylether compound having specific number average molecular weight is applied in invention to obtain a liquid crystal alignment agent having good UV stability. The liquid crystal alignment film and liquid crystal display element produced by the liquid crystal alignment agent have advantages of high voltage holding ratio and low ion density.

Therefore, the invention relates to a liquid crystal alignment agent comprising:
- a polymer composition (A) obtained by reacting a diamine compound (a) and a tetracarboxylic acid dianhydride compound (b);
- a solvent (B); and
- a poly(oxyalkyleneglycol)dialkylether compound (C); wherein the number average molecular weight of the poly(oxyalkyleneglycol)dialkylether compound (C) is from 250 to 2000.

The present invention also provides a liquid crystal alignment film made by the liquid crystal alignment agent as mentioned above.

The present invention also provides a liquid crystal display element comprising the liquid crystal alignment film as mentioned above.

BRIEF DESCRIPTION OF THE DRAWINGS

FIG. 1 shows the schematic diagram of the liquid crystal display element in a preferred embodiment of the invention.

DETAILED DESCRIPTION OF THE INVENTION

The invention relates to a liquid crystal alignment agent comprising:
- a polymer composition (A) obtained by reacting a diamine compound (a) and a tetracarboxylic acid dianhydride compound (b);
- a solvent (B); and
- a poly(oxyalkyleneglycol)dialkylether compound (C); wherein the number average molecular weight of the poly(oxyalkyleneglycol)dialkylether compound (C) is from 250 to 2000.

The polymer composition (A) according to the invention is obtained by reacting a diamine compound (a) and a tetracarboxylic acid dianhydride compound (b).

The preferred embodiment of the polymer composition (A) is a polyamic acid polymer, a polyimide polymer, a polyimide series block copolymer or combinations thereof. The preferred embodiment of the polyimide series block copolymer is a polyamic acid block copolymer, a polyimide block copolymer, a polyamic acid-polyimide block copolymer or combinations thereof.

The polyamic acid polymer, polyimide polymer and polyimide series block copolymer can all obtained by reacting the diamine compound (a) and the tetracarboxylic acid dianhydride compound (b).

According to the invention, the preferred embodiment of the diamine compound (a) is (1) aliphatic diamine compounds, (2) alicyclic diamine compounds, (3) aromatic diamine compounds, or (4) diamine compounds having the structures of Formulae (I-1) to (I-16). The above mentioned diamine compound (a) can be used alone or in combinations.

According to the invention, the (1) aliphatic diamine compounds comprise but are limited to 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7- diamino-3-methylheptane, 1,9-diamino-5-methylnonane, 2,11-diaminododecane, 1,12-diaminooctadecane, or 1,2-di(3-aminopropoxyl)ethane.

According to the invention, the (2) alicyclicdiamine compounds comprise but are limited to 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadienediamine, tricyclo[6.2.1.0$^{2,7}$]-undecenedimethyldiamine, or 4,4'-methylenedi(cyclohexylamine).

According to the invention, the (3) aromatic diamine compounds comprise but are limited to 4,4'-diaminodiphenylmethane (hereafter referred as μ-5), 4,4'-diaminodiphenylethane, 4,4'-diaminodiphenylsulfone, 4,4'-diaminobenzoylaniline, 4,4'-diaminodiphenylether (hereafter referred as μ-6), 3,4'-diaminodiphenylether, 1,5-diaminonaphthalene, 5-amino-1-(4'-aminophenyl)-1,3,3-trimethylinden, 6-amino-1-(4'-aminophenyl)-1,3,3-trimethylinden, hexahydro-4,7-methanohydroindenedimethylenediamine, 3,3'-diaminodibenzophenone, 3,4'-diaminodibenzophenone, 4,4'-diaminodibenzophenone, 2,2-bis[4-(4-aminophenoxyl)phenyl]propane, 2,2-bis[4-(4-aminophenoxyl)phenyl]hexafluoropropane, 2,2-bis(4-aminophenyl)hexafluoropropane, 2,2-bis[4-(4-aminophenoxyl)phenyl]sulfone, 1,4-bis(4-aminophenoxyl)benzene, 1,3-bis(4-aminophenoxyl)benzene, 1,3-bis(3-aminophenoxyl)benzene, 9,9-bis(4-aminophenyl)-10-hydroanthracene, 9,10-bis(4-aminophenyl)anthracene, [9,10-bis(4-aminophenyl)anthracene], 2,7-diaminofluorene, 9,9-bis(4-aminophenyl)fluorene, 4,4'-methylene-bis(2-chloroaniline), 4,4'-(p-phenyleneisobutenyl)dianiline, 4,4'-(m-phenyleneisobutenyl)dianiline, 2,2'-bis(4-(4-amino-2-trifluoromethylphenoxyl)phenyl) hexafluoropropane, 4,4'-bis((4-amino-2-trifluoromethyl)phenoxyl)-octafluorobiphenyl, 5-[4-(4-n-pentylcyclohexyl)cyclohexyl]phenylmethylene-1,3-diaminobenzene (hereafter referred as a-3), or 1,1-bis[4-(4-aminophenoxy)phenyl]-4-(4-ethylphenyl)cyclohexane (hereafter referred as a-2).

According to the invention, the (4)diamine compounds having the structures of Formulae (I-1) to (I-16) are illustrated as below:

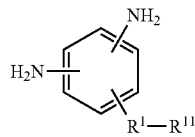

Formula (I-1)

In Formula (I-1), R$^1$ represents —O—, —COO—, —OCO—, —NHCO—, —CONH—, or —CO—; R" represents a steroid skeleton, a trifluoromethyl group, a fluoro group, a C$_2$ to C$_{30}$ alkyl group, or a monovalent group containing an N atom cyclic structure derived from pyridine, pyrimidine, triazine, piperidine, and piperazine. The preferred embodiment of the diamine compounds having the structure of Formula (I-1) is 2,4-diaminophenyl ethyl formate, 3,5-diaminophenyl ethyl formate, 2,4-diaminophenyl propyl formate, 3,5-diaminophenyl propyl formate, 1-dodecoxy-2,4-aminobenzene, 1-hexadecoxy-2,4-aminobenzene, 1-octadecoxy-2,4-aminobenzene,

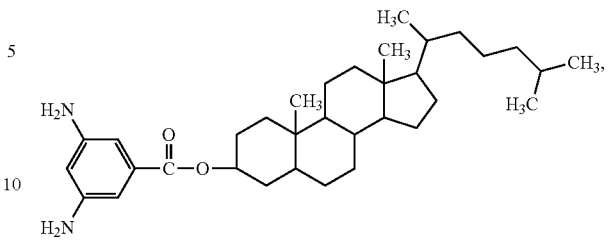

Formula (I-1-1)

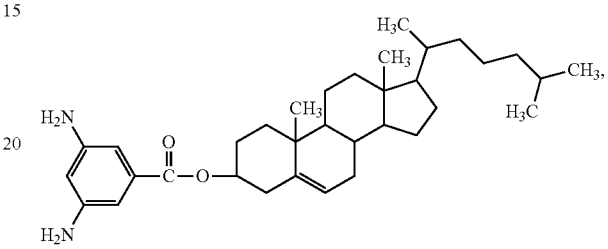

Formula (I-1-2)

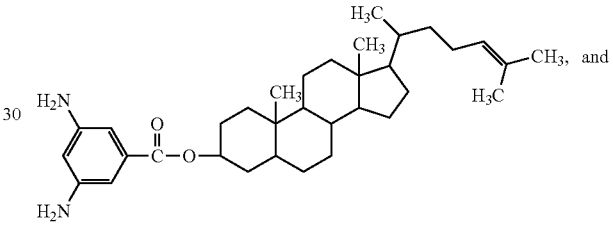

Formula (I-1-3)

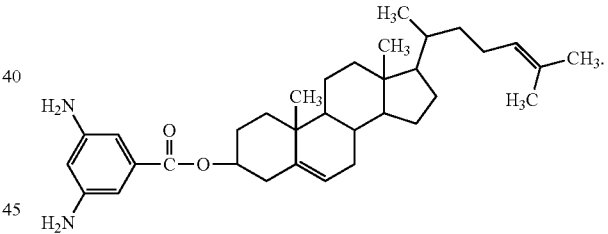

Formula (I-1-4)

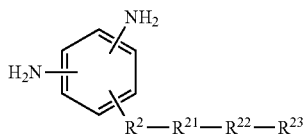

Formula (I-2)

In Formula (I-2), R$^2$ represents —O—, —COO—, —COO—, —NHCO—, —CONH—, or —CO—; R$^{21}$ and R$^{22}$ represents a divalent group selected from the group consisting of an alicyclic group, an aromatic group, and a heterocyclic group; R$^{23}$ represents a C$_3$ to C$_{18}$ alkyl group, a C$_3$ to C$_{18}$ alkoxyl group, a C$_1$ to C$_5$ fluoroalkyl group, a C$_1$ to C$_5$ fluoroalkoxyl group, a cyano group, or a halogen atom. The preferred embodiment of the diamine compounds having the structure of Formula (I-2) are:

Formula (I-2-1)
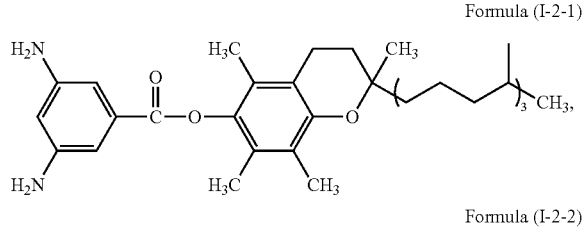

Formula (I-2-2)
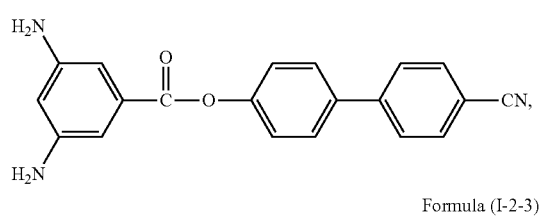

Formula (I-2-3)
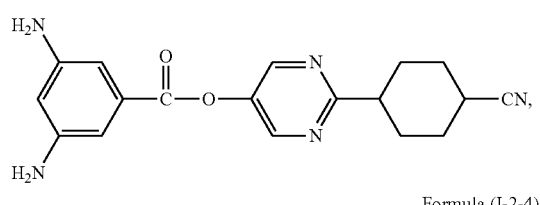

Formula (I-2-4)
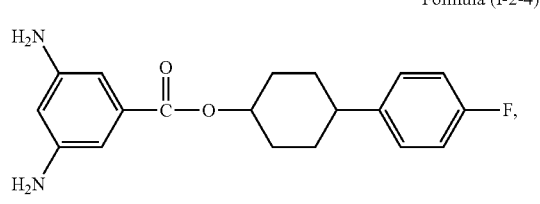

Formula (I-2-5)
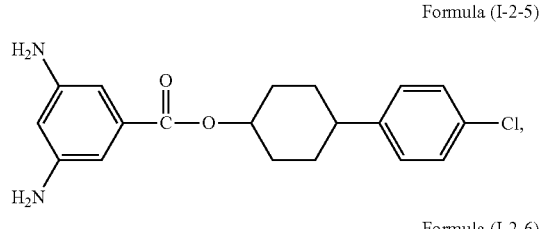

Formula (I-2-6)
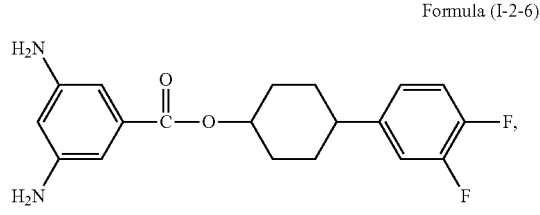

Formula (I-2-7)
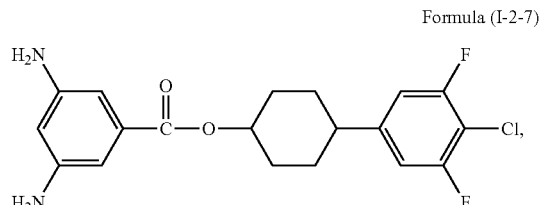

Formula (I-2-8)
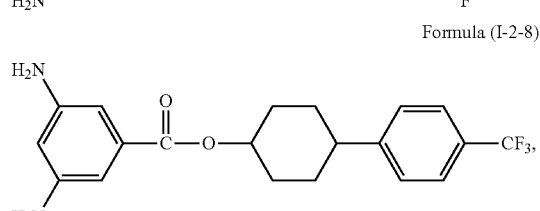

Formula (I-2-9)
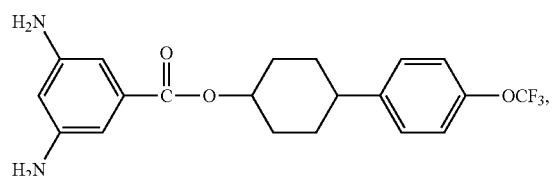

Formula (I-2-10)
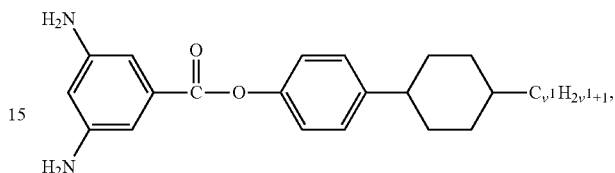

wherein $v^1$ represents an integer of 3 to 12,

Formula (I-2-11)
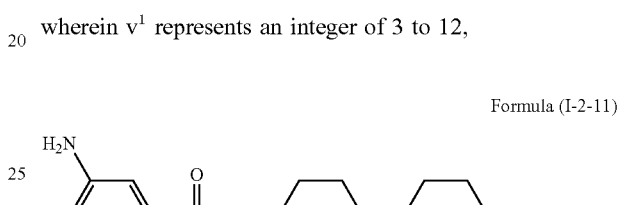

wherein $v^2$ represents an integer of 3 to 12,

Formula (I-2-12)
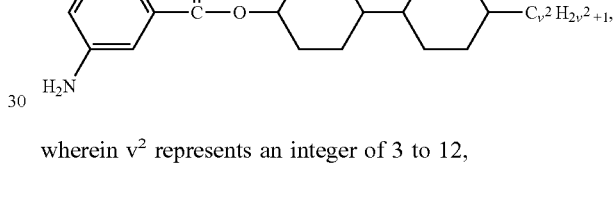

wherein $v^3$ represents an integer of 3 to 12,

Formula (I-2-13)
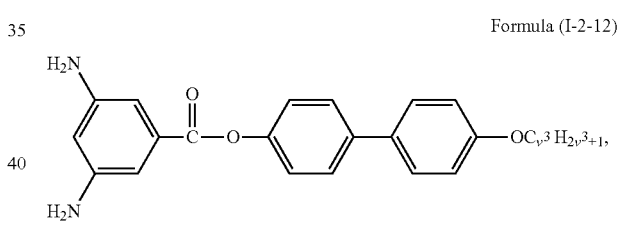

wherein $v^4$ represents an integer of 3 to 12.

Formula (I-3)
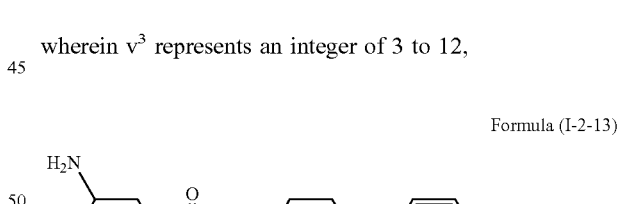

In Formula (I-3), $R^3$ represents a hydrogen, a $C_1$ to $C_5$ acyl group, a $C_1$ to $C_5$ alkyl group, a $C_1$ to $C_5$ alkoxyl group, or a halogen, and $R^3$ in each repeated unit is the same or different; n is an integer of 1 to 3. The preferred embodiment of the diamine compounds having the structure of Formula (I-3) is (1) when n is 1: p-diaminobenzene (hereafter referred to as a-4), m-diaminobenzene, o-diaminobenzene, or 2,5-diaminotoluene; (2) when n is 2: 4,4'-diaminobiphenyl, 2,2'-dimethyl-4,4'-diaminobiphenyl, 3,3'-dimethyl-4,4'-diaminobiphenyl, 3,3'-dimethoxyl-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxylbiphenyl, or 4,4'-diamino-2,2'-di(trifluoromethyl)biphenyl; (3) when n is 3: 1,4-di(4'-aminophenyl)benzene. More preferably, the Formula (I-3) is selected from p-diaminobenzene, 2,5-diaminotoluene, 4,4'-diaminobiphenyl, 3,3'-dimethoxyl-4,4'-diaminobiphenyl, or 1,4-di(4'-aminophenyl)benzene.

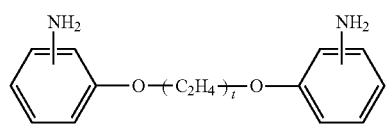

Formula (I-4)

In Formula (I-4), t is an integer of 2 to 12.

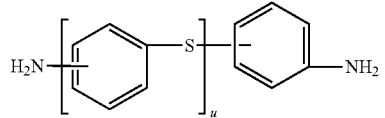

Formula (I-5)

In Formula (I-5), u is an integer of 1 to 5. Preferably, the diamine compound having the structure of Formula (I-5) is 4,4'-diaminodiphenylsulfide.

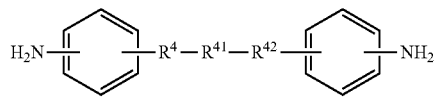

Formula (I-6)

In Formula (I-6), $R^4$ and $R^{42}$ are the same or different, and each represents a divalent organic group; $R^{41}$ represents a divalent group containing an N atom cyclic structure derived from pyridine, pyrimidine, triazine, piperidine, and piperazine.

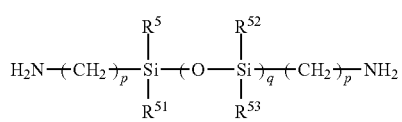

Formula (I-7)

In Formula (I-7), $R^5$, $R^{51}$, $R^{52}$ and $R^{53}$ are the same or different, and each represents a $C_1$ to $C_{12}$ hydrocarbon group; p is an integer of 1 to 3; q is an integer of 1 to 20.

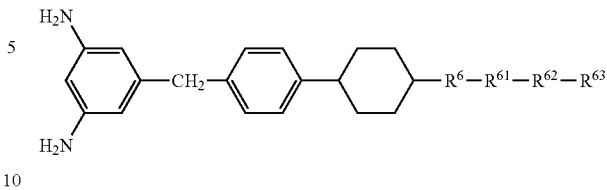

Formula (I-8)

In Formula (I-8), $R^6$ represents —O—, or a cyclohexalene group; $R^{61}$ represents —CH$_2$—; $R^{62}$ represents a phenylene group, or a cyclohexalene group; $R^{63}$ represents a hydrogen, or a heptyl group. The preferred embodiment of the diamine compounds having the structure of Formula (I-8) is

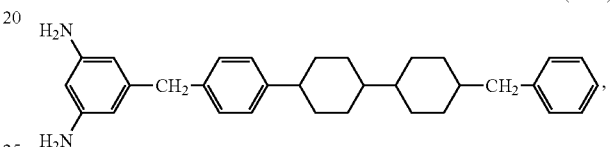

Formula (I-8-1)

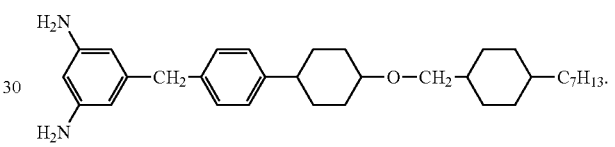

Formula (I-8-2)

The diamine compounds having the structures of Formulae (I-9) to (I-16) are listed below:

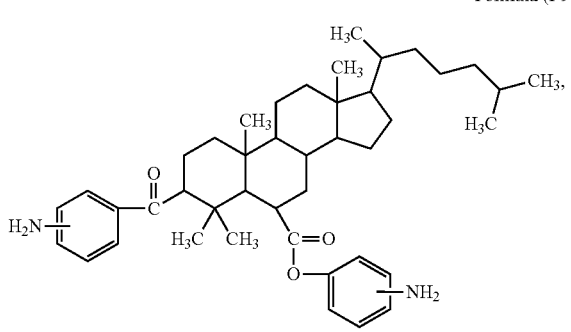

Formula (I-9)

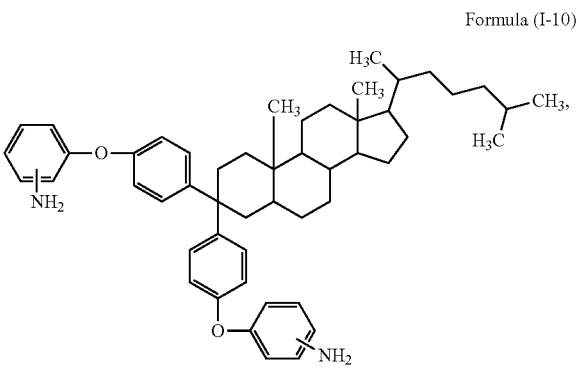

Formula (I-10)

-continued

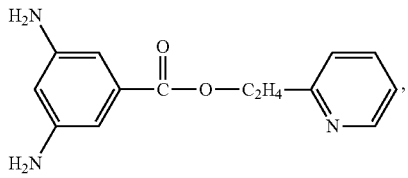
Formula (I-11)

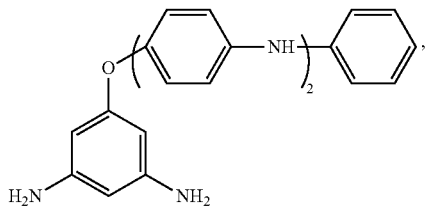
Formula (I-12)

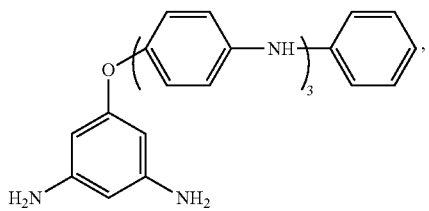
Formula (I-13)

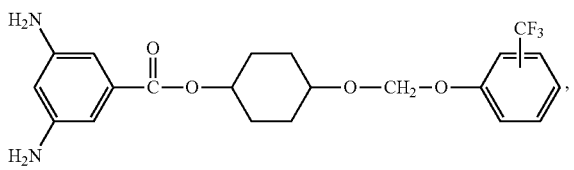
Formula (I-14)

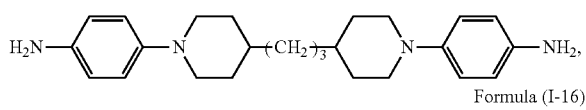
Formula (I-15)

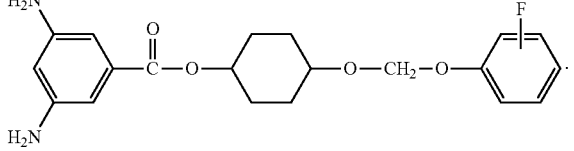
Formula (I-16)

Preferably, the diamine compound (a) comprises but is not limited to 1,2-diaminoethane, 4,4'-diaminodicyclohexylmethane, 4,4'-diaminodiphenylmethane, 4,4'-diaminodiphenylether, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, 2,4-diaminophenylethyl formate, Formula (I-1-1), Formula (I-1-2), Formula (I-2-1), Formula (I-2-11), p-diaminobenzene, m-diaminobenzene, o-diaminobenzene, the compound represented by Formula (I-8-1).

According to the invention, the tetracarboxylic acid dianhydride compound (b) refers to a compound comprising at least one tetracarboxylic acid dianhydride compound.

The preferred embodiment of the tetracarboxylic acid dianhydride compound in the tetracarboxylic acid dianhydride compound (b) is (1) aliphatic tetracarboxylic acid dianhydride compounds, (2) alicyclic tetracarboxylic acid dianhydride compounds, (3) aromatic tetracarboxylic acid dianhydride compounds, or (4)tetracarboxylic acid dianhydride compounds having the structures of Formulae (II-1) to (II-6). The above mentioned tetracarboxylic acid dianhydride compounds can be used alone or in combinations.

According to the invention, the (1) aliphatic tetracarboxylic acid dianhydride compounds comprise but are not limited to ethane tetracarboxylic dianhydride, or butane tetracarboxylic dianhydride.

According to the invention, the (2) alicyclic tetracarboxylic acid dianhydride compounds comprise but are not limited to 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dicholoro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyltetracarboxylic dianhydride, cis-3,7-dibutylcycloheptyl-1,5-diene-1,2,5,6-tetracarboxylic dianhydride, 2,3,5-tricarboxyliccycloheptylacetyl dianhydride, or dicyclo[2.2.2]-octyl-7-ene-2,3,5,6-tetracarboxylic dianhydride.

According to the invention, the (3) aromatic tetracarboxylic acid dianhydride compounds comprise but are not limited to 3,4-dicarboxylic-1,2,3,4-tetrahydronaphthalene-1-succinic dianhydride, pyromellitic dianhydride, 3,3',4,4'-dibenzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-diphenylethane tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxylicphenoxyl)phenylene sulfide dianhydride, 4,4'-bis(3,4-dicarboxylicphenoxyl)diphenyl sulfone dianhydride, 4,4'-bis(3,4-dicarboxylicphenoxyl)diphenylpropane dianhydride, 3,3',4,4'-perfluoroisopropylene diterephthalic acid dianhydride, 3,3',4,4'-diphenyltetracarboxylic dianhydride, bis(terephthalic acid)phenyl phosphine oxidedianhydride, p-phenylene-bis(triphenylterephthalic acid)dianhydride, m-phenylene-bis(triphenylterephthalic acid)dianhydride, bis(triphenylterephthalic acid)-4,4'-diphenylether dianhydride, bis(triphenylterephthalic acid)-4,4'-diphenylmethane dianhydride, ethylene glycol-bis(anhydrotrimelitate), propylene glycol-bis(anhydrotrimelitate), 1,4-butylene glycol-bis(anhydrotrimelitate), 1,6-heptylene glycol-bis(anhydrotrimelitate), 1,8-octylene glycol-bis(anhydrotrimelitate), 2,2-bis(4-hydrocarbonphenyl)propane-bis(anhydrotrimelitate), 2,3,4,5-tetrahydrofurantetracarboxylic dianhydride, 1,3,3a,4,5,9b-hexahydro-5-(tetrahydro-2,5-dioxofuran-3-yl)naphtho[1,2-c]furan-1,3-dione, 1,3,3a,4,5,9b-hexahydro-5-methyl-5-(tetrahydro-2,5-dioxol-3-furanyl)-naphtho[1,2-c]-furan-1,3-dione, 1,3,3a,4,5,9b-hexahydro-5-ethyl-5-(tetrahydro-2,5-dioxol-3-furanyl)-naphtho[1,2-c]-furan-1,3-dione, 1,3,3a,4,5,9b-hexahydro-7-methyl-5-(tetrahydro-2,5-dioxol-3-furanyl)-naphtho[1,2-c]-furan-1,3-dione, 1,3,3a,4,5,9b-hexahydro-7-ethyl-5-(tetrahydro-2,5-dioxol-3-furanyl)-naphtho[1,2-c]-furan-1,3-dione, 1,3,3a,4,5,9b-hexahydro-8-methyl-5-(tetrahydro-2,5-dioxol-3-furanyl)-naphtho[1,2-c]-furan-1,3-dione, 1,3,3a,4,5,9b-hexahydro-8-ethyl-5-(tetrahydro-2,5-dioxol-3-furanyl)-naphtho[1,2-c]-furan-1,3-dione, 1,3,3a,4,5,9b-hexahydro-5,8-dimethyl-5-(tetrahydro-2,5-dioxol-3-furanyl)-naphtho[1,2-c]-furan-1,3-dione, or 5-(2,5-dioxoltetrahydrofuranyl)-3-methyl-3-cyclohexene-1,2-dicarboxylic acid dianhydride.

According to the invention, the (4)tetracarboxylic acid dianhydride compounds having the structures of Formulae (II-1) to (II-6) are listed below:

Formula (II-1)

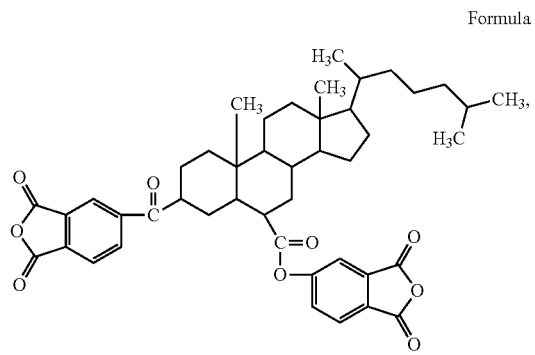

Formula (II-2)

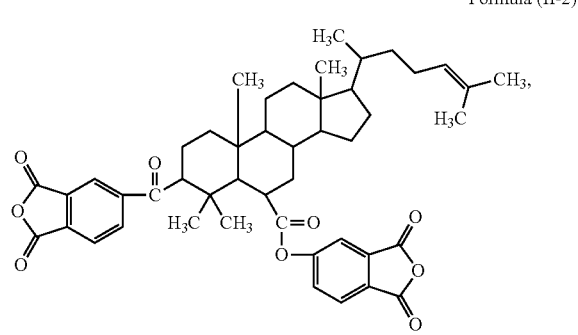

Formula (II-3)

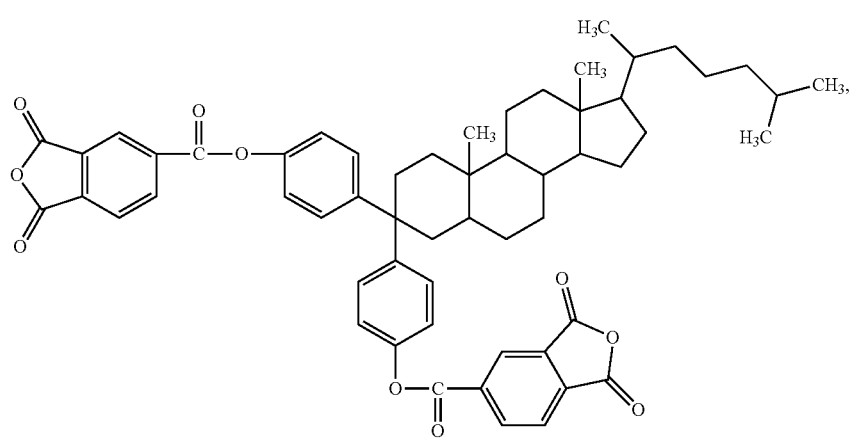

Formula (II-4)

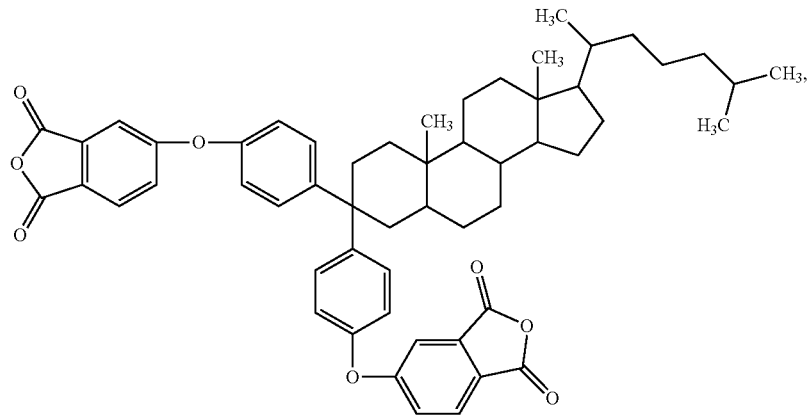

Formula (II-5)

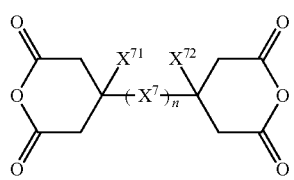

In Formula (II-5), $X^7$ represents a divalent group containing an aromatic ring; $n^1$ represents an integer of 1 to 2; $X^{71}$ and $X^{72}$ are the same or different, and each represents a hydrogen or an alkyl group. The preferred embodiment of the tetracarboxylic acid dianhydride compounds having the structure of Formula (II-5) is Formula (II-5-1)

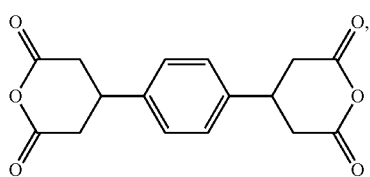

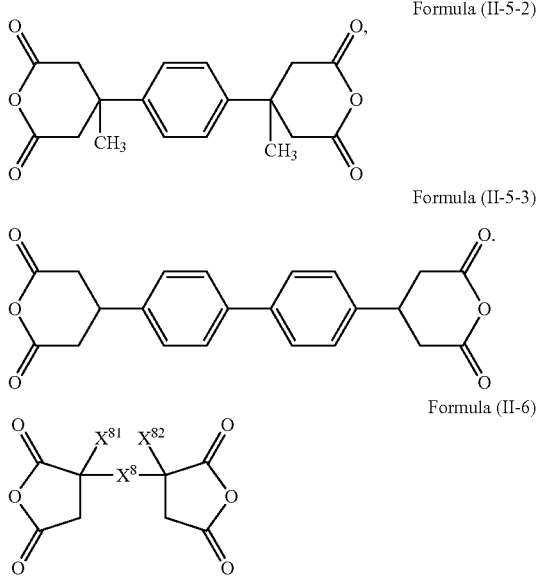

Formula (II-5-2)

Formula (II-5-3)

Formula (II-6)

In Formula (II-6), $X^8$ represents a divalent group containing an aromatic ring; $X^{81}$ and $X^{82}$ are the same or different, and each represents a hydrogen or an alkyl group. Preferably, the tetracarboxylic acid dianhydride compounds having the structure of Formula (II-6) is

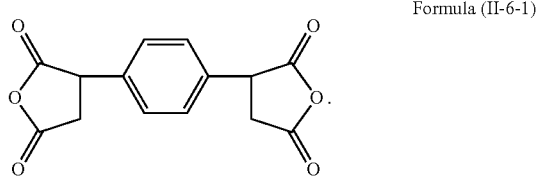 [SMILES: O=C1CC(c2ccc(C3CC(=O)OC3=O)cc2)C(=O)O1]

Formula (II-6-1)

Preferably, the tetracarboxylic acid dianhydride compound comprises but is not limited to 1,2,3,4-cyclobutane tetracarboxylic dianhydride, 1,2,3,4-cyclopentane tetracarboxylic dianhydride, 2,3,5-tricarboxyliccycloheptylacetyl dianhydride, 1,2,4,5-cyclohexane tetracarboxylic dianhydride, 3,4-dicarboxylic-1,2,3,4-tetrahydronaphthalene-1-succinicdianhydride, pyromellitic dianhydride, 3,3',4,4'-dibenzophenonetetracarboxylic dianhydride, and 3,3',4,4'-biphenylsulfonetetracarboxylic dianhydride.

According to the invention, the preparation of the polyamic acid polymer can be a common one. Preferably, the method for preparing the polyamic acid polymer comprising steps of: dissolving a mixture containing the diamine compound (a) and the tetracarboxylic acid dianhydride compound (b) in a solvent; conducting a polycondensation at 0° C. to 100° C. for 1 hour to 24 hours; and then distilling the reaction solution under reduced pressure with an evaporator to obtain the polyamic acid polymer; or adding the reaction solution to a large amount of a poor solvent to obtain a precipitate and drying the precipitate by distillation under reduced pressure to obtain the polyamic acid polymer.

Preferably, the total amount of the tetracarboxylic acid dianhydride compound (b) used is 20 mol to 200 mol based on the 100 mol of the diamine compound (a) used; more preferably, the total amount of the tetracarboxylic acid dianhydride compound (b) used is 30 mol to 120 mol.

The solvent used in the polycondensation and the solvent of the liquid crystal alignment agent can be the same or different. The solvent used in the polycondensation is not particularly limited as long as can dissolve the reactants and products. Preferably, the solvent comprises but is not limited to (1) aprotic polar solvent: N-methyl-2-pyrrolidone, N,N-dimethylacetylamine, N,N-dimethylformylamine, dimethylsulfoxide, γ-butyrolactone, tetramethyl urea, or hexamethylphosphoric triamide; (2) phenol solvent: m-cresol, xylenol, phenol, or halogenated phenols. Preferably, the amount of the solvent used in the polycondensation used is 200 parts by weight to 2000 parts by weight based on the 100 parts by weight of the mixture used. More preferably, the amount of the solvent used in the polycondensation used is 300 parts by weight to 1800 parts by weight.

Particularly, in the polycondensation, the solvent can be combined with a proper amount of poor solvent without precipitating the polyamic acid polymer. The poor solvent can be used alone or in combinations, and comprises but is not limited to (1) alcohols: methanol, ethanol, isopropanol, cyclohexanol, ethylene glycol, propylene glycol, 1,4-butylene glycol, or triethylene glycol; (2) ketones: acetone, methyl ethyl ketone, methyl isobutyl ketone, or cyclohexanone; (3) esters: methyl acetate, ethyl acetate, butyl acetate, diethyl oxalate, diethyl malonate, or ethylene glycol ethyl ether acetate; (4) ether: diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, or diethylene ethylene glycol dimethyl ether; (5) halogenated hydrocarbons: dichloromethane, 1,2-dichloroethane, 1,4-dichlorobutane, trichloroethane, chlorobenzene, or o-dichlorobenzene; (6) hydrocarbons: tetrahydrofuran, hexane, heptane, octane, benzene, toluene, or xylene; or (7) combinations thereof. Preferably, the amount of the poor solvent used is from 0 to 60 parts by weight based on 100 parts by weight of the diamine compound (a) used; more preferably, the amount of the poor solvent used is from 0 to 50 parts by weight.

According to the invention, the preparation of the polyimide polymer can be a common one, preferably, the preparation of the polyimide polymer comprising dissolving a mixture containing the diamine compound (a) and the tetracarboxylic acid dianhydride compound (b) in a solvent and conducting a polymerization to form the polyamic acid polymer, and in the presence of a dehydrating agent and catalyst, heating the reactants and conducting a dehydrated ring-closing reaction to change the amide group in the polyamic acid polymer to the imide group in the dehydrated ring-closing reaction and to obtain the polyimide polymer.

The solvent used in the dehydrated ring-closing reaction and the solvent of the liquid crystal alignment agent can be the same and is not repeated herein. Preferably, the amount of the solvent used in the dehydrated ring-closing reaction used is from 200 to 2000 parts by weight based on 100 parts by weight of the polyamic acid polymer used; more preferably, the amount of the solvent used in the dehydrated ring-closing reaction used is from 300 to 1800 parts.

If the reaction temperature of the dehydrated ring-closing reaction is lower than 40° C., the reaction is not completed resulting the degree of the imide of the polyamic acid polymer is poor. However, if the reaction temperature of the dehydrated ring-closing reaction is higher than 200° C., the weight average molecular weight of the polyimide polymer obtained is too low. Therefore, in order to obtain the optimal degree of imide of the polyamic acid polymer, the reaction temperature of the dehydrated ring-closing reaction is preferably 40° C. to 200° C.; more preferably, the reaction temperature of the dehydrated ring-closing reaction is 40° C. to 150° C.

The dehydrating agent used in the dehydrated ring-closing reaction is preferably selected from (1) acid anhydride compounds: acetate anhydride, propionic acid anhydride, or trifluoroacetate anhydride. The amount of the dehydrating agent used is from 0.01 mol to 20 mol based on 1 mol of the polyamic acid polymer used. The catalyst used in the dehydrated ring-closing reaction is selected from (1) pyridines: pyridine, trimethyl pyridine, or dimethyl pyridine; (2)triamines: triethylamine. The amount of the catalyst used is from 0.5 mol to 10 mol based on 1 mol of the dehydrating agent used.

The preferred embodiment of the polyimide series block copolymer is a polyamic acid block copolymer, a polyimide block copolymer, a polyamic acid-polyimide block copolymer or combinations thereof.

According to the invention, the preparation of the polyimide series block copolymer can be a common one. Preferably, the preparation of the polyimide series block copolymer comprising: dissolving a starting agent in a solvent and conducting a polycondensation to obtain the product. The starting agent comprises at least one of the above mentioned polyamic acid polymer and/or at least one of the above mentioned polyimide polymer, and optionally comprises a diamine compound and a tetracarboxylic acid dianhydride compound.

The diamine compound and the tetracarboxylic acid dianhydride compound in the starting agent are the same to the diamine compound (a) and the tetracarboxylic acid dianhydride compound (b) for preparing the polyamic acid polymer, and the solvent used in the polycondensation is the same to the solvent of the liquid crystal alignment agent and are not repeated herein.

Preferably, the amount of the solvent used in the polycondensation used is from 200 to 2000 parts by weight based on 100 parts by weight of the starting agent used; more preferably, the amount of the solvent used in the polycondensation used is from 300 to 1800 parts. Preferably, the temperature of the polycondensation is 0° C. to 200° C.; more preferably, the temperature of the polycondensation is 0° C. to 100° C.

Preferably, the starting agent comprises but is not limited to (1) two polyamic acid polymers with different terminals and structures; (2) two polyimide polymers with different terminals and structures; (3) polyamic acid polymers and polyimide polymers with different terminals and structures; (4) polyamic acid polymers, tetracarboxylic acid dianhydride compounds and diamine compounds, wherein the structures of at least one of the tetracarboxylic acid dianhydride compounds and diamine compounds differ to those of the tetracarboxylic acid dianhydride compound and diamine compound for forming the polyamic acid polymer; (5) polyimide polymers, tetracarboxylic acid dianhydride compounds and diamine compounds, wherein, the structures of at least one of the tetracarboxylic acid dianhydride compounds and diamine compounds differ to those of the tetracarboxylic acid dianhydride compound and diamine compound for forming the polyimide polymer; (6) polyamic acid polymers, polyimide polymers, tetracarboxylic acid dianhydride compounds and diamine compounds, wherein, the structures of the tetracarboxylic acid dianhydride compounds and diamine compounds differ to those of the tetracarboxylic acid dianhydride compound and diamine compound for forming the polyamic acid polymer and polyimide polymer; (7) two polyamic acid polymers, tetracarboxylic acid dianhydride compounds and diamine compounds with different structures; (8) two polyimide polymers, tetracarboxylic acid dianhydride compounds and diamine compounds with different structures; (9) two polyamic acid polymers and diamine compounds with an acid anhydride terminal and with different structures; (10) two polyamic acid polymers and tetracarboxylic dianhydrides with an amino terminal and with different structures; (11) two polyimide polymers and diamines with an acid anhydride terminal and with different structures; (12) two polyimide polymers and tetracarboxylic acid dianhydride compounds with an amino terminal and with different structures.

Without prejudice to the effect of the present invention, preferably, the polyamic acid polymer, the polyimide polymer and the polyimide series block copolymer can be a terminal-modified polymer with molecular weight adjustment. By using the terminal-modified polymer, the coating property of the liquid crystal alignment agent is improved. The preparation of the terminal-modified polymer can be adding a monovalent compound in the polycondensation of the polyamic acid polymer. The monovalent compound comprises but is not limited to (1) monovalent acid anhydrides: maleic anhydride, phthalic anhydride, itaconic anhydride, succinic anhydride, n-decyl, n-dodecyl succinic anhydride, succinic anhydride, n-tetradecyl, or n-hexadecyl succinic anhydride; (2) monovalent amines: aniline, cyclohexylamine, n-butylamine, n-pentyl amine, n-hexylamine, n-heptyl amine, n-octylamine, n-nonyl amine, n-decyl amine, n-undecane amine, n-dodecylamine, n-tridecylamine, n-tetradecyl amine, n-pentadecane amines, amine n-hexadecane, n-heptadecane amine, n-octadecylamine, or n-eicosylamine; (3) monovalent isocyanates: phenyl isocyanate, or naphthyl isocyanate ester.

According to the invention, the preferred embodiment of the solvent (B) is N-methyl-2-pyrrolidone, γ-butyrolactone, γ-butyrolactone lactam, 4-hydroxy-4-methyl-2-pentanone, ethylene glycol monomethyl ether, butyl lactate, butyl acetate ester, methoxy methyl propionate, ethyl ethoxy propionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monomethyl ethyl ether, diethylene glycol monomethyl ether acetate, diethylene glycol monoethyl ether acetate, N,N-dimethyl formamide, N,N-dimethyl-acetamide. The solvent can be used alone or in combinations.

In order to achieving the better printing property of the liquid crystal alignment agent, preferably, the amount of the solvent (B) used is from 500 to 3000 parts by weight based on 100 parts by weight of the polymer composition (A) used; more preferably, the amount of the solvent (B) used is from 800 to 2500 parts by weight; still more preferably, the amount of the solvent (B) used is from 1000 to 2000 parts by weight.

According to the invention, the alkoxyl group of the poly(oxyalkyleneglycol)dialkylether compound (C) is preferably ethoxyl, propoxyl or butoxyl. In another aspect, the alkyl group is preferably methyl, ethyl, n-propyl, iso-propyl, butyl or octyl.

According to the invention, the poly(oxyalkyleneglycol) dialkylether compound (C) is preferably polyethylene glycol dialkyl ether, such as: polyethylene glycol dimethyl ether, polyethylene glycol diethyl ether, polyethylene glycol diisopropyl ether, polyethylene glycol dibutyl ether, or polyethylene glycol dioctyl ether; polypropylene glycol dialkyl ether, such as: polypropylene glycol dimethyl ether, or polypropylene glycol diethyl ether; polybutylene glycol dialkyl ether, such as: polybutylene glycol dimethyl ether.

According to the invention, the number average molecular weight of the poly(oxyalkyleneglycol)dialkylether compound (C) is from 250 to 2000; preferably, the number average molecular weight of the poly(oxyalkyleneglycol) dialkylether compound (C) is from 350 to 1800; more preferably, the number average molecular weight of the poly(oxyalkyleneglycol)dialkylether compound (C) is from 450 to 1600. If the number average molecular weight of the poly(oxyalkyleneglycol)dialkylether compound (C) is less than 250 or larger than 2000, when using the alignment membrane made by the liquid crystal alignment agent in the liquid crystal display element, the voltage holding ratio decreases dramatically and the ion density is over high through UV irradiation.

Preferably, the amount of the poly(oxyalkyleneglycol) dialkylether compound (C) used is from 1 to 20 parts by weight based on 100 parts by weight of the polymer composition (A) used; more preferably, the amount of the poly(oxyalkyleneglycol)dialkylether compound (C) used is from 2 to 18 parts by weight; still more preferably, the amount of the poly(oxyalkyleneglycol)dialkylether compound (C) used is from 3 to 15 parts by weight. If the poly(oxyalkyleneglycol)dialkylether compound (C) is absent, when using the alignment membrane made by the liquid crystal alignment agent in the liquid crystal display element, the voltage holding ratio decreases dramatically and the ion density is over high through UV irradiation.

Without prejudice to the effect of the present invention, the liquid crystal alignment agent according to the invention preferably comprising an additive (D). The additive (D) is preferably an epoxy compound or a silane compound having a functional group. The additive (D) is to improve adhesion of the liquid crystal alignment film to the substrate. The additive (D) can be used alone or in combinations.

The silane compound having a functional group comprises but is not limited to 3-aminopropyl trimethoxy silane, 3-aminopropyl triethoxy silane, 2-amino propyl trimethoxy silane, 2-aminopropyl triethoxy silane, N-(2-aminoethyl)-3-aminopropyl trimethoxy silane, N-(2-aminoethyl)-3-amino propyl methyl dimethoxy silane, 3-ureido propyl trimethoxy silane, 3-ureido propyl triethoxy silane, N-ethoxycarbonyl-3-aminopropyl trimethoxy silane, N-ethoxycarbonyl-3-aminopropyl triethoxy silane, N-triethoxysilylpropyl triethylenetriamine, N-trimethoxysilylpropyl triethylenetriamine, 10-trimethoxysilyl-1,4,7-triazadecane, 10-triethoxy silyl-1, 4,7-triazadecane, 9-trimethoxysilyl-3,6-diazanonylacetate, 9-triethoxysilyl-3,6-diazanonylacetate, N-benzyl-3-aminopropyl trimethoxy silane, N-benzyl-3-aminopropyl triethoxy silane, N-phenyl-3-aminopropyl trimethoxy silane, N-phenyl-3-aminopropyl triethoxy silane, N-bis(ethylene oxide)-3-aminopropyl trimethoxy silane, or N-bis(ethylene oxide)-3-aminopropyl triethoxy silane.

The epoxy compound comprises but is not limited to ethylene glycol diglycidyl ether, polyethylene glycol diglycidyl ether, propylene glycol diglycidyl ether, tripropylene glycol diglycidyl ether, polyethylene glycol diglycidyl ether, neopentyl ethylene glycol diglycidyl ether, 1,6-hexanediol diglycidyl ether, glycerin diglycidyl ether, 2,2-dibromo neopentyl glycol diglycidyl ether, 1,3,5,6-tetraglycidyl-2,4-hexanediol, N,N,N',N'-tetraglycidyl-m-xylene diamine, 1,3-bis(N,N-diglycidylaminomethyl)cyclohexane, N,N,N',N'-tetraglycidyl-4,4'-diamino diphenyl methane, N,N-glycidyl-p-glycidoxy aniline, 3-(N-allyl-N-glycidyl)aminopropyl trimethoxy silane, or 3-(N,N-diglycidyl)aminopropyl trimethoxy silane.

The preparation of the liquid crystal alignment agent is not limited, and can be a common mixture method; such as mixing the polyamic acid polymer and the polyimide polymer and optionally the polyimide series block copolymer to form a polymer composition (A), and then adding the solvent (B) and the poly(oxyalkyleneglycol)dialkylether compound (C) to the polymer composition (A) at 0° C. to 200° C. and optionally adding the additive (D) and mixing with a stirring means to dissolving the reactants. Preferably, at 20° C. to 60°, adding the solvent (B) and the poly (oxyalkyleneglycol)dialkylether compound (C) to the polymer composition.

Preferably, the amount of the additive used is from 0.5 to 50 parts by weight based on 100 parts by weight of the polymer composition (A) used; more preferably, the amount of the additive used is from 1 to 45 parts by weight.

The present invention also provides a liquid crystal alignment film made by the liquid crystal alignment agent as mentioned above.

Preferably, the method for forming the liquid crystal alignment film comprising: coating the liquid crystal alignment agent on a surface of a substrate to form a coating film by a roller coating method, a spinner coating method, a printing method, or an inkjet method; and conducting a pre-bake treatment, post-bake treatment and alignment treatment to obtain the coating film.

The pre-bake treatment is for volatilizing the organic solvent in the coating film. Preferably, the pre-bake treatment is conducted at 30° C. to 120° C.; more preferably at 40° C. to 110° C.; still more preferably at 50° C. to 100° C.

The alignment treatment is not limited, and can be conducted by rubbing in a certain direction for alignment with a roller wound with a cloth made by nylon, rayon, cotton and other fibers.

The post-bake treatment is for a further dehydrated ring-closing reaction (imidization) of the polymer in the coating film. Preferably, the post-back treatment is conducted at 150° C. to 300° C., more preferably at 180° C. to 280° C., still more preferably at 200° C. to 250° C.

The present invention also provides a liquid crystal display element comprising the liquid crystal alignment film as mentioned above.

The method for producing the liquid crystal display element is known to artisans skilled in this field and only briefed as below.

Referring to FIG. 1, in the preferred embodiment of the invention, the liquid crystal display element comprises a first unit 11, a second unit 12 set opposite to the first unit 11 with an interval, and a liquid crystal unit 13 set between the first unit 11 and the second unit 12.

The first unit 11 comprises a first substrate 111, a first conductive film 112 formed on the first substrate 111, and a first liquid crystal alignment film 113 formed on a surface of the first conductive film 112.

The second unit 12 comprises a second substrate 121, a second conductive film 122 formed on the second substrate 121, and a second liquid crystal alignment film 123 formed on a surface of the second conductive film 122.

The first substrate 111 and the second substrate 121 is a transparent material. The transparent material comprises but is not limited to alkali-free glass, soda-lime glass, hard glass (Pyrex glass), and quartz glass, polyethylene terephthalate, polybutylene terephthalate, polyether sulfone, or polycarbonate for liquid crystal display device. The material of the first conductive film 112 and the second conductive film 122 is selected from $SnO_2$, $In_2O_3$—$SnO_2$, or the like.

The first liquid crystal alignment film 113 and the second liquid crystal alignment film 123 is the above mentioned liquid crystal alignment film, respectively, and are for forming a pretilt angle of the liquid crystal unit 13. The liquid crystal unit 13 can be driven by the electric field formed by the first conductive film 112 and the second conductive film 122.

The liquid crystal used in the liquid crystal unit 13 can be used alone or in combinations. The liquid crystal comprises but is not limited to diaminobenzene liquid crystal, pyridazine liquid crystal, shiff base liquid crystal, azoxy liquid crystal, biphenyl liquid crystal, phenyl cyclohexane liquid crystal, ester liquid crystal, terphenyl liquid crystal, biphenylcyclohexane liquid crystal, pyrimidine liquid crystal, dioxane liquid crystal, bicyclooctane liquid crystal, or cubane liquid crystal, and optionally adding steroid liquid crystal such as cholesteryl chloride, cholesteryl nonanoate, or cholesteryl carbonate), or chiral agent such as C-15, CB-15 (manufactured by Merck), or ferroelectric liquid crystal such as p-decyloxybenzylidene-p-amino-2-methyl-butyl cinnamate.

The following examples are given for the purpose of illustration only and are not intended to limit the scope of the present invention.

EXAMPLE

Preparation of the Polymer Composition (a)

Synthesis Example 1

A 500 mL four-necked flask set with a nitrogen inlet, stirrer, condenser and thermometer, and nitrogen was purged. The feed composition comprises: 1.69 g (0.003 mol) of compound having the structure of Formula (I-2-1) (hereafter referred as a-1) and 5.02 g (0.047 mol) of p-diaminobenzene (hereafter referred as a-4), and is stirred to dissolved. Then, 10.91 g (0.05 mol) of pyromellitic dianhydride (hereafter referred as b-1) and 20 g of N-methyl-2-pyrrolidone are added for reacting at the room temperature for 2 hours. After completing the reaction, the reaction solution are poured into 1500 mL of water to precipitate the polymers. The polymers filtered are washed with methanol and filtered for three times and dried at 60° C. with a vacuum oven to obtain the polyamic acid polymer (A-1-1).

Synthesis Examples 2 and 3

The Synthesis Examples 2 and 3 are similar to Synthesis Example 1 with the modifications of the kind and amount of the tetracarboxylic acid dianhydride compound or diamine compound as shown in Table 1.

Synthesis Example 4

A 500 mL four-necked flask set with a nitrogen inlet, stirrer, condenser and thermometer, and nitrogen was purged. The feed composition comprises: 4.54 g (0.0425 mol) of a-4, 1.49 g (0.0075 mol) of 4,4'-diaminodiphenyl-methane (hereafter referred as a-5), and 80 g of NMP, and is stirred to dissolved. Then, 10.69 g (0.049 mol) of b-1 and 20 g of NMP are reacted at the room temperature for 6 hours, and 97 g of NMP, 5.61 g of acetic anhydride and 19.75 g of pyridine are added and heated to 60° C. for imidization for 2 hours. After completing the reaction, the reaction solution is poured into 1500 mL of water to precipitate the polymers. The polymers filtered are washed with methanol and filtered for three times and dried at 60° C. with a vacuum oven to obtain the polyamic acid polymer (A-2-1).

Synthesis Examples 5 to 7

The Synthesis Examples 5 to 7 are similar to Synthesis Example 4 with the modifications of the kind and amount of the tetracarboxylic acid dianhydride compound or diamine compound as shown in Table 1.

TABLE 1

| | | Synthesis Examples | | | | | | |
|---|---|---|---|---|---|---|---|---|
| | | 1 | 2 | 3 | 4 | 5 | 6 | 7 |
| Component | | A-1-1 | A-1-2 | A-1-3 | A-2-1 | A-2-2 | A-2-3 | A-2-4 |
| diamine compound | a-1 | 6 | 15 | | | | 6 | 6 |
| (a) | a-2 | | | 80 | | | | |
| (mole %) | a-3 | | | | | 20 | | |
| | a-4 | 94 | 55 | | 85 | | | |
| | a-5 | | 30 | | 15 | | | 94 |
| | a-6 | | | 20 | | 80 | 94 | |
| tetracarboylic acid | b-1 | 100 | 50 | | 98 | | | 97 |
| dianhydride | b-2 | | | 101 | | 100 | | |
| compound (b) | b-3 | | 50 | | | | 100 | |
| (mole %) | | | | | | | | |

Compound
a-1 compound having the structure of Formula (I-2-1)
a-2 1,1-bis[4-(4-aminophnoxy)phenyl]-4-(4-ethylphenyl)cyclohexane
a-3 5-[4-(4-n-pentylcyclohexyl)cyclohexyl]phenylmethylene-1,3-diaminobenzene
a-4 p-diaminobenzene
a-5 4,4'-diaminodiphenylmethane
a-6 4,4'-diaminodiphenylether
b-1 pyromellitic dianhydride
b-2 1,2,3,4-cyclobutane tetracarboxylic dianhydride
b-3 3,4-dicarboxylic-1,2,3,4-tetrahydronaphthalene-1-succinic dianhydride Preparation of Liquid Crystal Alignment Agent, Liquid Crystal Alignment Film and Liquid Crystal Display Element Example 1

One-hundred parts by weight of the polymer composition (A) prepared as Synthesis Example 1, 1000 parts by weight of N-methyl-2-pyrrolidone, 500 parts by weight of ethylene glycol n-butyl ether, and 15 parts by weight of polyethylene glycol dimethyl ether (number average molecular weight of 350) are mixed at the room temperature to form a liquid crystal alignment agent.

The liquid crystal alignment agent is coated on two glass substrates with ITO (indium-tin-oxide) conductive film by a printing machine (manufactured by Japan Nissha Printing Co., Ltd., Model No. S15-036) to form coating films. The coating films are heated at 100° C. by a heating plate for 5 minutes for a pre-bake treatment and then heated at 220° C. by a circulation oven for 30 minutes for a post-bake treatment. After an alignment treatment, a liquid crystal alignment film is obtained on each of the glass substrates.

One of the two glass substrates having the liquid crystal alignment film as mentioned above is coated with thermal-compression adhesive agent, and the other is poured with spacers of 4 μm. The two glass substrates are adhered at 150° C. in the vertical direction of alignment and pressed by 10 kg with a heat pressing machine. Then, liquid crystal is added by a liquid crystal pouring machine (manufactured by Shimadzu Corporation, Model No. ALIS-100X-CH), and the injection port of liquid crystal is sealed with UV curing adhesive and cured by UV irradiation. An annealing treatment was conducted at 60° C. for 30 minutes in an oven to obtain a liquid crystal display element. The liquid crystal alignment agent and liquid crystal display element are evaluated as below and the results are shown in Table 2.

Examples 2 to 7 and Comparative Examples 1 to 4

Examples 2 to 7 and Comparative Examples 1 to 4 are similar to Example 1 for the preparation of the liquid crystal alignment agent, liquid crystal alignment film and liquid crystal display element with the modifications of the kind and amount of the polymer composition, solvent, and additive. The liquid crystal alignment agent and liquid crystal display element are evaluated as below and the results are shown in Table 2.

Evaluation Items
UV stability:
a. Voltage Holding Ratio

The voltage holding ratio of the liquid crystal display element in Examples 1 to 7 and Comparative Example 1 to 4 are measured by an electrical measuring machine (manufactured by TOYO Corporation, Model 6254) with the condition of applying 4 Volt for 2 ms and 1667 ms intervals. The voltage holding ratio of relieving after 1667 ms is measured (as VHR1); and then the liquid crystal display element is subjected to 4200 mJ/cm² of a UV irradiation machine (Model KN-SH48K1; manufactured by Kuangneng Corporation), and the voltage holding ratio (as VHR2) is measured in the same condition. The UV stability of voltage holding ratio (as $VHR^{UV}$) is calculated according to the equation below:

$$VHR^{UV}(\%) = \frac{VHR1 - VHR2}{VHR1} \times 100\%$$

The evaluation standards are as follows.
◉: $VHR^{UV}$<5%
○: 5%≤$VHR^{UV}$<10%
△: 10%≤$VHR^{UV}$<20%
X: 20%≥$VHR^{UV}$ b. Ion Density The ion density of the liquid crystal display element in Examples 1 to 7 and Comparative Example 1 to 4 are measured by an electrical measuring machine (manufactured by TOYO Corporation, Model 6254) with the condition of applying 1.7 Volt, 0.01 Hz of triangular wave. In the current-voltage waveform, the ion density (as ID1) is determined by calculating the peak area of 0 to 1 volt. Then, the liquid crystal display element is subjected to 4200 mJ/cm² of UV irradiation machine (Model KN-SH48K1; manufactured by Kuangneng Corporation), the ion density (as ID2) is determined in the same condition. Finally, the UV stability of ion density (as $ID^{UV}$) is calculated according to the equation below:

$$ID^{UV}(\%) = \frac{ID2 - ID1}{ID1} \times 100\%$$

The evaluation standards are as follows.
◉: $ID^{UV}$<5%
○: 5%≤$ID^{UV}$<10%
△: 10%≤$ID^{UV}$<20%
X: 20%≥$ID^{UV}$ The results are shown in Table 2. According to Table 2, the voltage holding ratio and ion density of the Examples are better than those of the Comparative Examples. Therefore, the liquid crystal alignment agent according to the invention has the good UV stability.

TABLE 2

| Component (parts by weight) | | Example 1 | 2 | 3 | 4 | 5 | 6 | 7 | Comparative Example 1 | 2 | 3 | 4 |
|---|---|---|---|---|---|---|---|---|---|---|---|---|
| polymer composition (A) | A-1-1 | 100 | | | | | | | 100 | | | |
| | A-1-2 | | 100 | | | | | | | 100 | | |
| | A-1-3 | | | 100 | | | | | | | 100 | |
| | A-2-1 | | | | 100 | | | | | | | 100 |
| | A-2-2 | | | | | 100 | | | | | | |
| | A-2-3 | | | | | | 100 | | | | | |
| | A-2-4 | | | | | | | 100 | | | | |
| solvent (B) | B-1 | 1000 | 1000 | 600 | | | 1800 | 1000 | 1000 | 1000 | 600 | |
| | B-2 | 500 | | 400 | 250 | 1200 | | 300 | 500 | | 400 | 300 |
| | B-3 | | 500 | | 1000 | | | 300 | | 500 | | 1000 |
| poly(oxyalkylene-glycol)dialkylether compound (C) | C-1 | 15 | | | 10 | | 1 | | | | | |
| | C-2 | | 10 | | 10 | | | | | | | |
| | C-3 | | | | | | 20 | 0.5 | | | | |
| | C-4 | | | 5 | | 3 | | | | | | |
| Other poly(oxyalkylene-glycol)dialkylether compound (C') | C'-1 | | | | | | | | 15 | | | |
| | C'-2 | | | | | | | | | 10 | | |
| additive (D) | D-1 | | 5 | | | | 3 | | | | | |
| | D-2 | | | 2 | | | 1 | | | | | 2 |
| Assay | UV stability | voltage holding ratio | ◉ | ◉ | ○ | ◉ | ○ | ◉ | ○ | X | X | X | X |
| | | ion density | ◉ | ◉ | ○ | ◉ | ○ | ◉ | ○ | X | X | X | X | number average molecular weight

B-1    N-methyl-2-pyrrolidone
B-2    ethylene glycol n-butyl ether

TABLE 2-continued

| | | |
|---|---|---|
| B-3 | N,N-dimethylacetylamine | |
| C-1 | polyethylene glycol dimethyl ether | 350 |
| C-2 | polyethylene glycol diethyl ether | 1200 |
| C-3 | polypropylene glycol dimethyl ether | 250 |
| C-4 | polyethylene glycol dimethyl ether | 2000 |
| C'-1 | polyethylene glycol dimethyl ether | 200 |
| C'-2 | polyethylene glycol dimethyl ether | 2500 |
| D-1 | N,N,N',N'-tetraglycidyl-4,4'-diamino diphenyl methane | |
| D-2 | N,N-diglycidyl-p-glycidoxy aniline | |

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A liquid crystal alignment agent comprising:
   a polymer composition (A) obtained by reacting a diamine compound (a) and a tetracarboxylic acid dianhydride compound (b);
   a solvent (B); and
   a poly(oxyalkyleneglycol)dialkylether compound (C);
   wherein the number average molecular weight of the poly(oxyalkyleneglycol)dialkylether compound (C) is from 250 to 2000;
   wherein the diamine compound (a) having the structure of Formula (I-2):

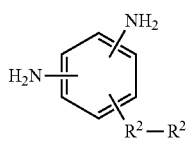

Formula (I-2)

wherein $R^2$ represents —O—, —COO—, —OCO—, —NHCO—, —CONH—, or —CO—; $R^{21}$ and $R^{22}$ represents a divalent group selected from the group consisting of an alicyclic group, an aromatic group, and a heterocyclic group; $R^{23}$ represents a $C_3$ to $C_{18}$ alkyl group, a $C_3$ to $C_{18}$ alkoxyl group, a $C_1$ to $C_5$ fluoroalkyl group, a $C_1$ to $C_5$ fluoroalkoxyl group, a cyano group, or a halogen atom.

2. The liquid crystal alignment agent according to claim 1, wherein the number average molecular weight of the poly(oxyalkyleneglycol)dialkylether compound (C) is form 350 to 1800.

3. The liquid crystal alignment agent according to claim 1, wherein the number average molecular weight of the poly(oxyalkyleneglycol)dialkylether compound (C) is from 450 to 1600.

4. The liquid crystal alignment agent according to claim 1, wherein the amount of the solvent (B) used is from 500 to 3000 parts by weight, and the amount of the poly(oxyalkyleneglycol)dialkylether compound (C) used is from 1 to 20 parts by weight based on 100 parts by weight of the polymer composition (A) used.

5. The liquid crystal alignment agent according to claim 1, wherein the amount of the solvent (B) used is from 800 to 2500 parts by weight, and the amount of the poly(oxyalkyleneglycol)dialkylether compound (C) used is from 2 to 18 parts by weight based on 100 parts by weight of the polymer composition (A) used.

6. The liquid crystal alignment agent according to claim 1, wherein the amount of the solvent (B) used is from 1000 to 2000 parts by weight, and the amount of the poly(oxyalkyleneglycol)dialkylether compound (C) used is from 3 to 15 parts by weight based on 100 parts by weight of the polymer composition (A) used.

7. The liquid crystal alignment agent according to claim 1, wherein the alkoxyl group of the poly(oxyalkyleneglycol)dialkylether compound (C) comprises an ethoxyl group, a propoxyl group or a butoxyl group.

8. The liquid crystal alignment agent according to claim 1, wherein the alkyl group of the poly(oxyalkyleneglycol)dialkylether compound (C) comprises a methyl group, an ethyl group, an n-propyl group, an iso-propyl group, a butyl group, or an octyl group.

9. A liquid crystal alignment film made by the liquid crystal alignment agent according to claim 1.

10. A liquid crystal display element comprising the liquid crystal alignment film according to claim 9.

* * * * *